June 24, 1930.  F. E. ALLEN  1,766,164
DISK CULTIVATOR
Filed July 15, 1929
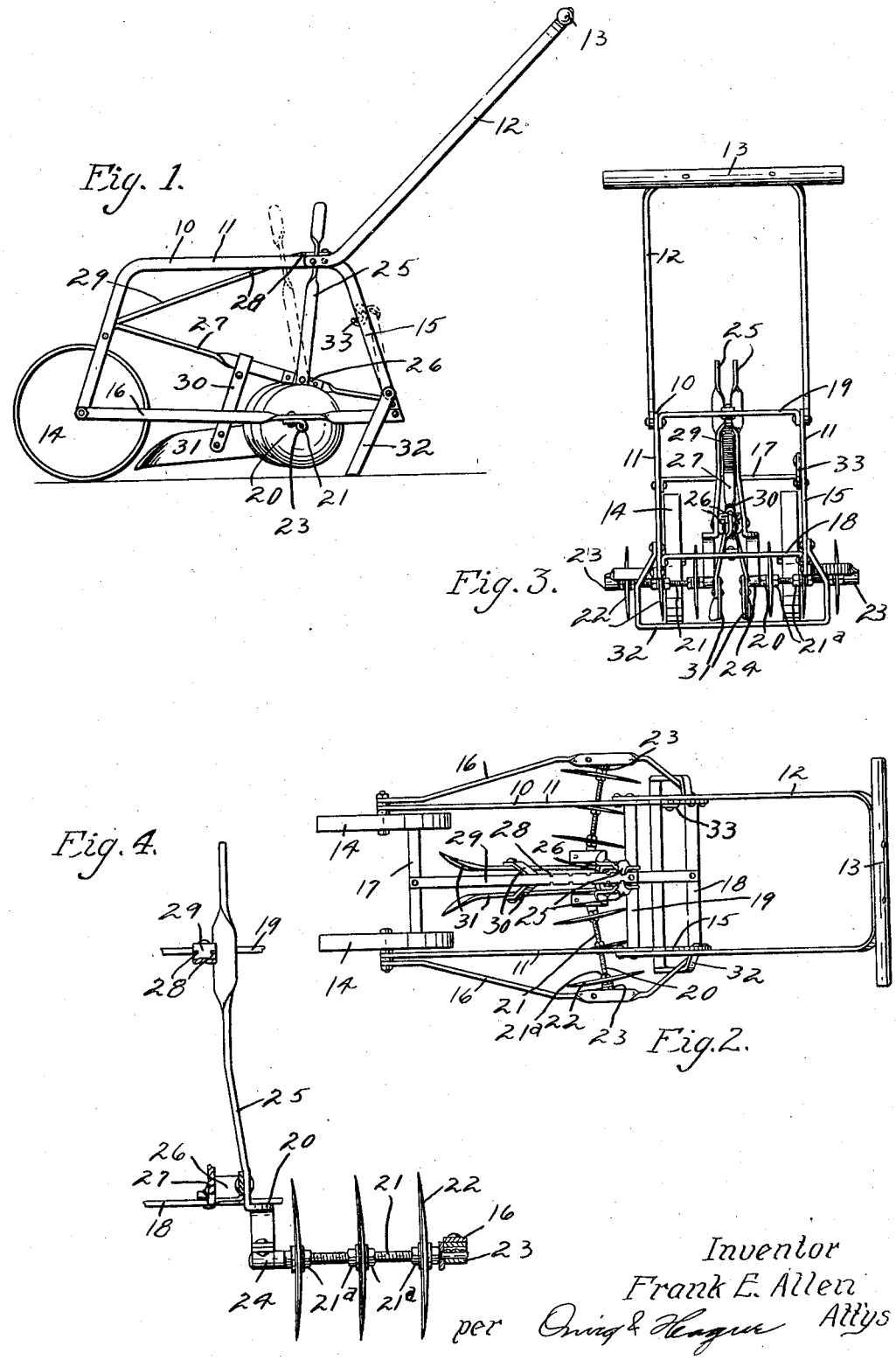
Inventor
Frank E. Allen Patented June 24, 1930

1,766,164

UNITED STATES PATENT OFFICE

FRANK E. ALLEN, OF BOONE, IOWA

DISK CULTIVATOR

Application filed July 15, 1929. Serial No. 378,316.

My invention relates to that class of hand cultivators having rotatable disks for loosening and working the earth on both sides of a row of plants.

The object of my invention is to provide a device of this character of simple, durable and inexpensive construction in which rotatable disks operate to loosen and work the earth and destroy the weeds on both sides of a plant row over which the device may be moved, and which may be adjusted to work the loosened earth inwardly or outwardly of said plant row.

A further object is to provide a cultivator of this character having means for protecting the plants and their leaves and preventing them from being covered by the earth loosened and worked by the disks.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved disk cultivator.

Figure 2 shows a plan view of same.

Figure 3 shows a rear view of the device.

Figure 4 shows an enlarged detail view of one of the cultivating elements and its adjusting lever.

Referring to the accompanying drawings I have used the reference numeral 10 to indicate the frame generally. Said frame consists of inverted, substantially U-shaped side portions having handle bars 12 attached thereto and extending rearwardly and upwardly. A handle 13 is attached to the upper end of said bars for pushing and guiding the machine. Lower side members 16 close the lower ends of the inverted U-shaped side portions and complete said side portions.

Guide wheels 14 are rotatably mounted on the forward ends of the side portions 11 to movably support the forward end of the cultivator above the ground surface and to provide an easy means to guide the device. Said wheels are spaced apart so that they will travel on opposite sides of a plant row over which the cultivator may be moved. Said side members are rigidly connected by cross members 17, 18 and 19.

The earth working elements 20 are spaced apart and extend outwardly relative to the plant row so that they may loosen and work the earth on both sides of said row. Each earth working element comprises a threaded shaft 21 on which is mounted a plurality of spaced disks 22 secured against rotary and lateral movement on the shaft by nuts 21$^a$.

It is very desirable at times to change the spacing of the disks to accommodate plants of different sizes between the working elements 20, and this construction permits such changes to be made easily and quickly.

The outer end of the shaft 22 is rotatably mounted in a bearing 23 pivotally attached to the member 16 of the frame and having its free end adapted to be moved in a substantially horizontal plane. Each shaft is provided with an adjustment lever 25 having a bearing 24 pivoted to its lower end, in which bearing the inner end of the shaft 21 is rotatably mounted. The element 20 is adapted to be adjusted to change the angle of the disks relative to the direction of movement, and to cause the earth to be worked inwardly or outwardly of the plant row when the cultivator is moved over said row.

The disks may be flat or concave. The flat disk is preferable only when frequent adjustments to work the earth first in one direction and then the other are to be made. The working elements may be adjusted to work the earth from one side to the other, as well as working it inwardly or outwardly of the plant row.

The adjustment levers are pivotally mounted on a bowed portion 26 of a longitudinal member 27, which is attached at its rear end to cross member 18 and extends upwardly and forwardly and is attached at its front end to the cross member 17. The upper ends of the levers 25 extend above the bowed portion 26 and are adapted to fit into notches 28 in a longitudinally extending member 29 attached at its rear end to cross member 19 and extend forwardly and downwardly, and attached at its forward end to the cross member 17. Said notches hold the levers in various positions of adjustment.

Depending from the longitudinal member 27 are strips 30 having spaced shields 31 attached to their lower ends. Said shields extend longitudinally of the cultivator between the elements 20 and are adapted to allow plants to pass between them and prevent the earth loosened by the disks from covering the plants. The front ends of the shields are beveled upwardly and rearwardly and are bent slightly outwardly to raise the leaves of the larger plants and keep them from being covered with loosened earth. A stand 32 is pivotally attached to the downwardly extending rear member 15 of the side portion 11, so that the rear end of the device may be held in a raised position to keep the disks from resting on a floor or other hard surface when the machine is not in use, thus protecting the cutting edge of said disks. A hook 33 pivoted to one of the rear side members 15 is adapted to hold the stand out of the way when the cultivator is being operated.

The advantage of this cultivator is that the disks of the earth working elements may be quickly and easily adjusted longitudinally of the shaft on which they are mounted. It is often desirable to quickly change the spacing of the disks, particularly where the size of the plants in different beds vary considerably, and this can be done by the construction above described.

Another advantage of this device is that the earth working elements are pivotally mounted at their outer ends and their inner ends are free to be adjusted, thus providing a certain amount of adjustment to accommodate different size plants, for it will be seen that as the inner end moves in an arc and the distance of the disks from the plants in the plant row will vary as the working element is moved to different positions of adjustment. The ends of the levers are on the top and in the center where they are easily accessible to make quick adjustments.

A further advantage is that the shields protect the small plants and prevent them from being covered by the loosened earth and their flanged and beveled front ends will raise the leaves of the larger plants, thus preventing the leaves from being cut up by the disks and preventing the loosened earth from covering them.

I claim as my invention:

1. In a device of the class described, a frame having spaced side portions rigidly connected, wheels attached to the frame to movably support the front end of said frame, earth working elements adapted to allow plants in a plant row to pass between said elements, each earth working element comprising a rotatable shaft, a series of spaced disks on said shaft, means for adjusting the disks longitudinally of the shaft, and means between the earth working elements for preventing the loosened earth from covering the plants.

2. In a device of the class described, a frame having spaced side portions rigidly connected, wheels attached to the frame to movably support the front end thereof, earth working elements adapted to allow plants in a plant row to pass between said elements, each earth working element comprising a substantially horizontal shaft, a series of spaced disks mounted on the shaft, a bearing in which the outer end of the shaft is rotatably mounted, said bearing being pivotally attached to the adjacent side portion, a lever pivoted to the free end of the shaft and adapted to adjust the angle of the disks relative to the direction of movement so that the earth may be worked inwardly or outwardly of the plant row.

3. In a device of the class described, a frame having spaced side portions rigidly connected, wheels attached to the frame to movably support the front end thereof, earth working elements adapted to allow plants in a plant row to pass between said elements, each earth working element comprising a substantially horizontal shaft, a series of spaced disks mounted on the shaft, a bearing in which the outer end of the shaft is rotatably mounted, said bearing being pivotally attached to the adjacent side portion, a lever pivoted to the free end of the shaft and adapted to adjust the angle of the disks relative to the direction of movement so that the earth may be worked inwardly or outwardly of the plant row, said lever being pivotally mounted on the frame and extending upwardly, the upper end of said lever extending above the top of the frame.

4. In a device of the class described, a frame having spaced side portions rigidly connected, wheels attached to the frame to movably support the front end thereof, earth working elements adapted to allow plants in a plant row to pass between said elements, each earth working element comprising a substantially horizontal shaft, a series of spaced disks mounted on the shaft, a bearing in which the outer end of the shaft is rotatably mounted, said bearing being pivotally attached to the adjacent side portion, a lever pivoted to the free end of the shaft and adapted to adjust the angle of the disks relative to the direction of movement so that the earth may be worked inwardly or outwardly of the plant row, said lever being pivotally mounted on the frame and extending upwardly, the upper end of said lever extending above the top of the frame, and shields extending longitudinally of the frame between the earth working elements and adapted to raise the leaves of the plants and protect said plants from being covered by the loosened earth.

5. In a device of the class described, a frame having spaced side partitions rigidly connected, disk supporting shafts, a series of spaced disks in each shaft, means for pivotally connecting the outer ends of said shafts to their adjacent frame members, and a lever pivoted to the inner end of each shaft adapted to adjust the angle of the disks relative to their line of movement so that earth engaged by said disk may be moved inwardly or outwardly of a plant row.

Des Moines, Iowa, June 19, 1929.

FRANK E. ALLEN.